Patented June 2, 1936

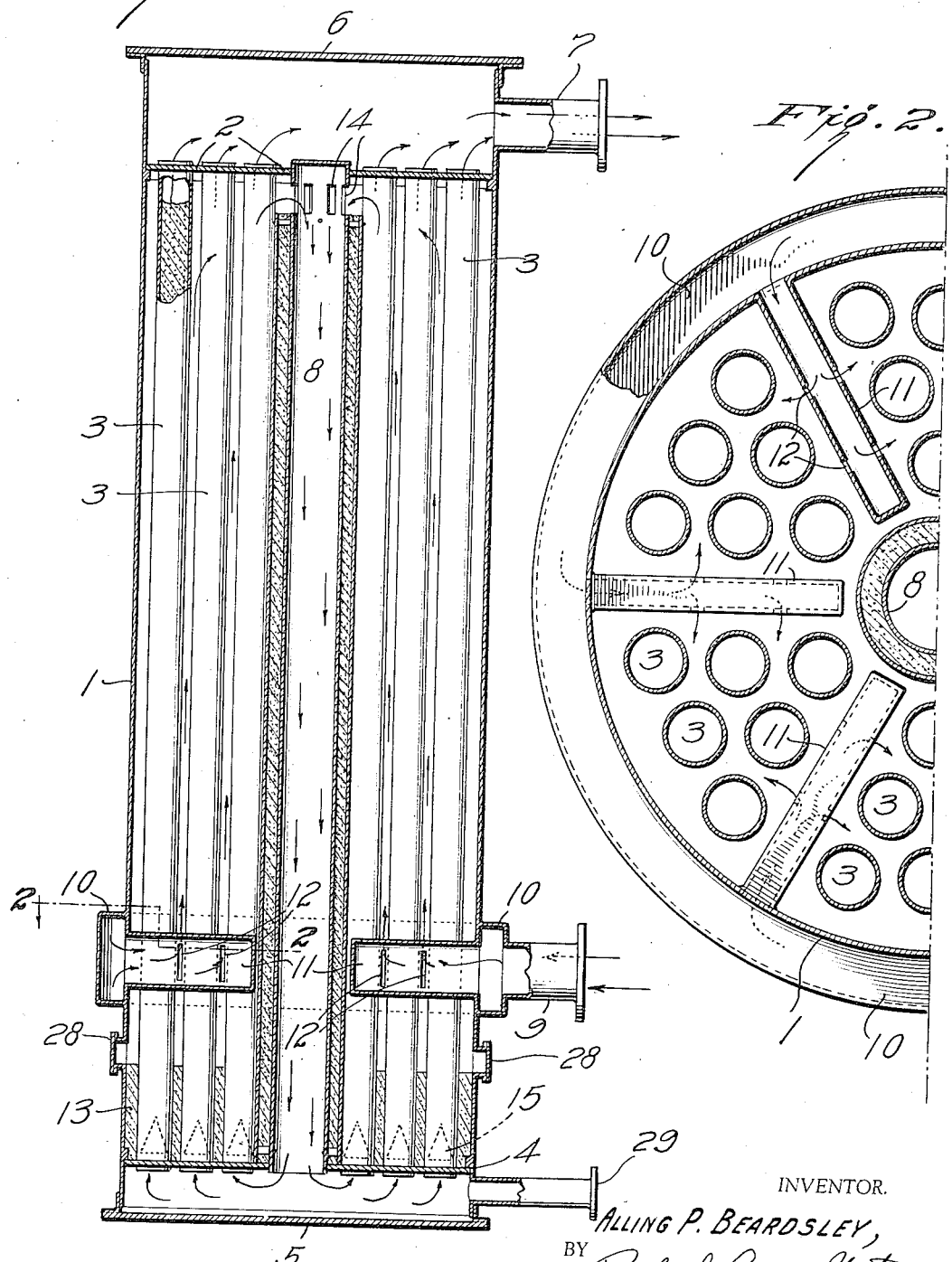

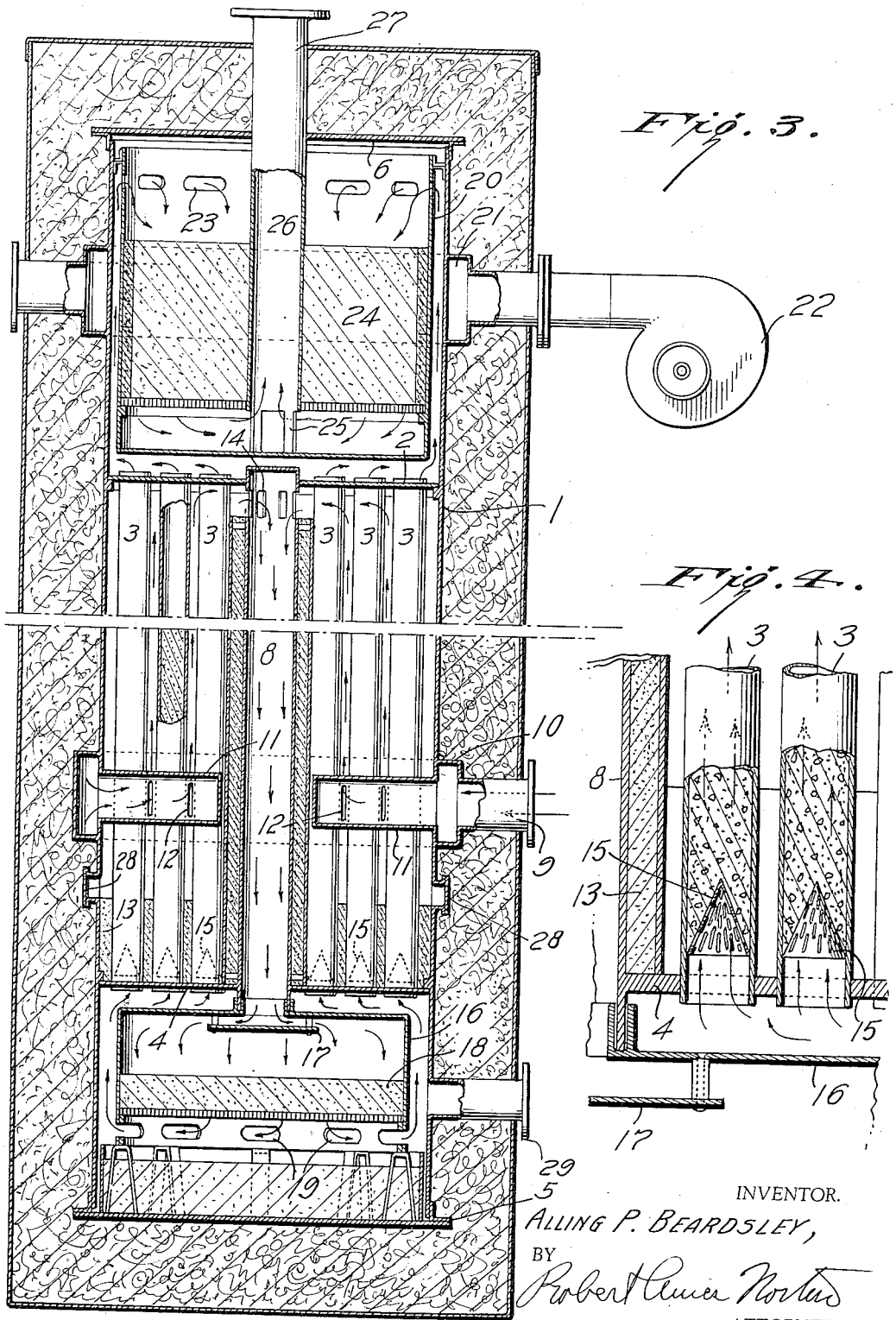

2,042,922

UNITED STATES PATENT OFFICE 2,042,922

PROCESS AND APPARATUS FOR VAPOR PHASE CATALYSES

Alling P. Beardsley, Plainfield, N. J., assignor to The Calco Chemical Company, Inc., Bound Brook, N. J., a corporation of Delaware Application August 4, 1933, Serial No. 683,582

10 Claims. (Cl. 23—288)

This invention relates to a process for carrying out highly exothermic gas phase catalytic oxidations and apparatus therefor.

In the past highly exothermic catalytic vapor phase reactions such as catalytic oxidations, have in general been carried out in two main types of converters. Bath cooled converters and converters in which the cooling has been effected by contact with incoming cold gases—this latter type is the one almost exclusively used in the catalytic oxidation of $SO_2$ to $SO_3$ with which reaction the present invention is principally concerned in its preferred embodiments although it is also applicable to other highly exothermic catalytic vapor phase oxidations which can be carried out in converters of the reaction gas cooled type. The reaction gas cooled converters in their turn can be generally divided into three main types. Tray type converters in which all of the cooling is by radiation from the converter shell or heat exchangers between converters; secondly, tubular converters in which the catalyst is contained in the tubes such as for example, in well known Knietsch converters and converters in which cooling tubes are embedded in the catalyst, as is exemplified for instance in the converters of the Jaeger type.

When reaction gas is used for cooling converters it is normally circulated in countercurrent to the flow of gas through the catalyst. (See for example the converters of the Knietsch type and converters illustrated in the various patents to Jaeger, such as Patent No. 1,660,511.) The countercurrent flow which has become standard in sulfuric acid converters of the reaction gas cooled type, was thought to be necessary because it provides a maximum cooling effect and it was considered that a concurrent flow in sulfuric acid converters could not be used as the cold incoming reaction gases encountered the first layers of the catalyst where reaction is just started and there would be danger of overcooling the catalyst before sufficient reaction had taken place to evolve enough heat to keep the catalyst ignited. In the ammonia synthesis one type of converter with embedded cooling tubes has been built in which the flow of gases through the cooling tubes is concurrent with the flow of gases through the catalyst, both flows being from top to bottom. This type of converter is, of course, unsuitable for sulfuric acid manufacture and can only be used in a reaction such as the ammonia reaction where the gases before passing through the cooling tubes are preheated to but little below reaction temperature where no considerable temperature gradient in the catalyst exists or is desirable.

According to the present invention strongly exothermic reactions such as catalytic oxidations of sulfur dioxide to sulfur trioxide are carried out in reaction gas cooled converters in which the reaction gas flows concurrently with the gas through the catalyst and both flows are from the bottom upward. This is directly contrary to the accepted practice and produces a remarkable new control effect, namely a completely automatic control of temperature coupled with a practically automatic adjustment of temperature through any horizontal section of the catalyst. When the reaction gas flows in the same direction in heat exchange with the gases flowing through the catalyst, the two gases are first at widely different temperatures and as the flow continues the two gases gradually approach each other, the temperature control being completely automatic, for the greater the heat evolution in any part of the catalyst, the faster will be the upward flow of reaction gases adjacent thereto and correspondingly the greater the cooling effect. Moreover an extraordinarily uniform temperature regulation horizontally is readily obtained because if the heat evolution in any horizontal section of the catalyst varies the temperature of the reaction gases in heat exchange with this particular portion will also vary and the speed of upward flow of course increases or decreases with the temperaure. Hence if any portion of a horizontal section of the catalyst evolves more heat the reaction gases adjacent thereto will be heated to a higher temperature resulting in a greater flow of cooling gas adjacent to this particular catalyst section, the increase of flow being of course proportionate to the extra heat given off.

While in its broader aspects the invention is not limited to processes or apparatus in which the catalyst is contained in tubes and the reaction gas flows over the tubes, I prefer this modification as an extremely compact converter can be built and the greatest uniformity of temperature through any horizontal cross section is obtained when a free flow of reaction gases around the various catalyst tubes is permitted. However, all of the advantages of automatic vertical temperature regulation are retained when the reaction gas is passed upwardly through the heat exchange elements embedded in the catalyst and a horizontal temperature regulating effect is obtained although not quite so efficient a regulation as in the case of a converter in which the catalyst is in tubes.

So sensitive and automatically regulated is the temperature control when the process and apparatus of the present invention is employed that the only regulating means normally necessary is the temperature of the incoming reaction gases. In large installations, particularly in one of the preferred modifications in which a tubular converter is combined with one or more trays some jacket cooling of the tray may also be included but in the tubular section the control is entirely automatic and depends only on inlet gas temperature.

For many plants a simple converter of the present invention containing only tubes is sufficient and permits an exceptionally compact design. However, in larger converters it is sometimes desirable to provide a catalyst tray after the tubes so that any inequality in resistance in the catalyst in individual tubes is equalized.

The difficulties which are involved in upward co-flow in a tubular converter and which in the past were considered insurmountable, involved primarily the tendency of the cold incoming reaction gases to cool the first parts of the catalyst tubes to too low a temperature so that the reaction which had hardly started might go out. In the present invention it is found desirable to cause the incoming reaction gases to contact with the catalyst tubes somewhat above their lowest point or to provide a small amount of catalyst in an uncooled layer ahead of the tubes. The bottoms of the tubes can be very easily insulated by surrounding them with a layer of insulating material such as kieselguhr or asbestos. The present invention therefore contemplates either insulating the bottoms of the catalyst tubes or providing an uncooled catalyst layer in advance of the tubes or both. In either event the reaction is permitted to proceed for a sufficient distance in the catalyst in the absence of cooling to attain sufficient velocity and sufficient temperature to prevent the converter being blown out by incoming cold reaction gases.

From an apparatus standpoint the insulation of the lower portion of the catalyst tubes performs a further valuable function in that it acts as a packing and permits the tubes to freely slide up and down in the bottom tube sheet to compensate for any expansion or contraction of the tubes or of the converter as a whole. One or the most serious maintenance difficulties in tubular converters is thereby completely avoided and the converter by reason of this flexibility is not likely to suffer from strains due to differential warping.

The catalyst in the tubes is retained by means of individual slotted cones of sheet metal spot welded to the tubes. Of course other retaining means can be used but the cones present considerable advantages in that they are not readily plugged by reason of their large surface.

In order to obtain the maximum effects of the automatic temperature regulation inherent in the upward co-flow principle of the invention, it is necessary to return the gases which have flowed over the catalyst tubes from the top to the bottom of the converter so that the gases may then pass upwardly through the tubes. Preferably this return duct or ducts should be insulated so that the reaction gases which have been preheated to the desired temperature will retain their heat until they encounter the catalyst.

The invention will be described in greater detail in conjunction with the drawings in which
Fig. 1 is a vertical section through a converter provided with tubes only;
Fig. 2 is half a horizontal section through Fig. 1 along the line 2—2;
Fig. 3 is a vertical section through a converter provided with tubes and a preliminary and final uncooled catalyst layer or tray; and
Fig. 4 is a detail of the bottom of the tubes showing the conical catalyst supports.

In Fig. 1 the converter proper consists of shell 1, an upper tube sheet 2 in which catalyst tubes 3 are rolled and a lower tube sheet 4 through which the catalyst tubes project with a sliding fit. Bottom piece 5 and top piece 6 are also provided, the top piece carrying a gas outlet pipe 7. In the center of the converter there is provided a return duct 8 with insulated walls. Reaction gas enters the system through pipe 9, bustle box 10 and distributing spiders 11 which are provided with slots 12. The whole converter is surrounded with a thick insulation not shown in Fig. 1.

The incoming reaction gases which, in the case of contact sulfuric acid process, may be 7–8% SO₂ gases at about 260° C., are distributed by means of the spiders 11 and contact with the catalyst tubes some distance above the bottom. The lower part of the catalyst tubes are surrounded with insulation 13, for example kieselguhr or asbestos, which is introduced, for example, as a slurry, through the flanged openings 28. The reaction gases flow upwardly over the catalyst tubes increasing their temperature and finally are deflected by the upper tube sheet through the slots 14 into the central well 8. They pass down this well without loss in temperature and in fact with a slight gain due to radiant heat from the catalyst tubes which is absorbed by the wall of the central well. The gases then pass out into the bottom piece 5 and rise up through the catalyst tubes which are filled to the top with catalyst supported on slotted steel cones 15 (see Fig. 4). After leaving the catalyst tubes the gases flow out from the top piece 6 through the reacted gas main 7.

An automatic temperature regulation is effected as the speed with which the reaction gases flow up over the tubes increases with increased evolution of heat in the catalyst and the more heat the reaction gases pick up in the bottom of the tubes the less they cool at the top so that an extremely uniform temperature is assured in the upper portions of the catalyst tubes, a feature of vital importance in most reactions particularly in the oxidation of sulfur dioxide where the equilibrium and hence maximum conversion percentage is determined by the temperature in the last portions of the catalyst.

There is no danger of overcooling the bottom parts of the catalyst as they are protected from the cool reaction gases by the layer of insulation which incidentally also serves to retain heat so that temporary short shut downs do not result in a converter which will not start up again. The portions of the catalyst insulated from reaction gases retain their heat and permit the reaction to start up after short shut downs.

While the simple converter shown in Fig. 1 is very compact and can be used effectively, it is desirable particularly in larger installations where high efficiency at heavy loadings is required, to provide for additional uncooled catalyst. This design is shown in Fig. 3 in which the tubular section is identical with that in Fig. 1 and the same parts bear the same reference numerals. The catalyst tubes are however, not filled quite to the top which is desirable in some designs with certain catalysts where resistance to gas must be kept low. The reaction gases after leaving the central well 8 instead of passing directly into the tubes flow into a catalyst basket 16 where they are distributed by the baffle 17 and pass down through the catalyst layer 18 which is supported on a screen or tray. After leaving the catalyst layer they flow out through slots 19 in the bottom of the basket, thence up around the basket and up through the catalyst tubes. The operation in the catalyst tubes is the same as in Fig. 1 and the same automatic temperature control is obtained. After leaving the catalyst tubes the partly reacted gases flow up over an upper catalyst basket 20, being cooled if desired by contact with an air jacket 21 surrounding a portion of the converter shell adjacent to the catalyst layer in the basket. Cooling air for the jacket is blown around it by means of the blower 22 and the amount of cooling can be accurately adjusted. After passing over the upper basket the gases enter the latter through the openings 23, pass downwardly through the upper catalyst layer 24 thence through openings 25 into a central well 26 and out through the exhaust pipe 27.

When starting up a cold converter it is necessary to heat the portion of the catalyst first encountered by reaction gases to an ignition temperature. In most converters this involves passing hot air or combustion gases through the whole system which is wasteful of fuel as it results in a heating up of the whole heat exchange system. In the converters embodying the present invention, however, this is very simply effected by introducing hot air through the flanged pipe 29 at the bottom of the converter. This by-passes the heat exchange system and the hot air encounters directly the catalyst in the bottom of the tubes so that this portion of the catalyst is rapidly heated up and in a short time is obtained for the reaction to start. The ease and rapidity with which the converters embodying the present invention can be started up is a further advantage and adds considerably to the flexibility of the system, particularly when used for plants which are frequently shut down.

The design shown in Fig. 3, which is particularly efficient for compact units of high capacity, presents a number of advantages over the more simple modification shown in Fig. 1. Thus, for example, the catalyst layer in the lower catalyst basket provides for rapid heating of the reaction gases and a considerable amount of reaction at relatively high temperature. This is important in the contact sulfuric acid process as it permits a considerable amount of conversion with a small amount of catalyst using the large amount of catalyst following to obtain the greatest final conversion of the remaining unconverted $SO_2$. A very desirable temperature control is also effected, for example, in a sulfuric acid converter the inlet $SO_2$ in pipe 9 may be 260° C. the temperature rising to about 450° C. on entering the central well, 460° on leaving and 600° on leaving the lower catalyst layer. The gases passing up from the ends of the tubes over the upper catalyst basket leave at 455° C., are cooled to about 430° C. before passing through the upper catalyst layer and finally leave the latter at about 440° which permits a very efficient final conversion equilibrium. In fact the temperature gradient through the catalyst as the gases pass along is hardly distinguishable from the theoretically ideal temperature gradient for the reaction, and as it is automatically controlled by the upward con-current flow the converter operates at all times at highest efficiency and the process of the present invention in this preferred embodiment presents a reliability and efficiency which make it commercially very attractive.

As an apparatus the converter shown in Fig. 3 is extraordinarily compact and lends itself readily to installations in which room is at a premium. Moreover the converter is extremely accessible, the upper catalyst basket can be lifted out by removing the top of the converter and the lower catalyst basket can likewise be removed, thus making removal of the catalyst very easy and permitting easy access to the converter for making any repairs which may be necessary. The layer in the lower catalyst basket not only performs the function of preliminary conversion but it effectively entraps any dust which may enter the system. If it becomes clogged with dust as it may after years of running, it is a very simple matter to remove the catalyst layer, screen and replace it. This dual function of the preliminary contact and dust filter is an important feature of the preferred embodiment of the invention and one which is of great practical operating importance.

The present invention may be used with any type of catalyst which is suitable for the particular reaction in question. I have found, however, that excellent results may be obtained by using the vanadium catalyst described in the Laury Patent No. 1,862,825, June 14, 1932. The same catalyst can be used throughout the various sections of the converter or if desired, catalysts of slightly differing activity and size may be employed. For this purpose I have found that highly active catalysts in the two uncooled layers with slightly less active but physically more rugged and coarser catalysts in the tubes, gives very satisfactory results.

While Fig. 3 shows a combined tubular and layer converter in a single compact structure which is of importance for many commercial plants, it should be understood that the invention is not limited to such compact installations and thus, for instance, the upper uncooled catalyst layer may be in a separate converter and of course more than one uncooled layer may be used although the effectiveness of the upward co-flow principle makes it unnecessary to use a large amount of catalyst in order to obtain the output since the catalyst is being operated under conditions close to the ideal from the thermal standpoint and is therefore worked under conditions of maximum efficiency which permit high output with a moderate amount of catalyst.

Fig. 3 shows both insulation and a lower catalyst basket. The temperature reached by the reaction gases in the lower catalyst layer is sufficiently high so that tubes un-insulated down to their bottom could be employed. However, some insulation is desirable because it acts as an efficient gas seal or packing while permitting free movement of the catalyst tubes through the lower tube sheet thus preventing any strain through differential expansion. In fact it will be noted that all of the internal elements of the converter are attached to one or other end only and are free to expand. The tubes hang from the upper tube sheet, the top basket from the top of the converter, while the central well is supported by the lower tube sheet and in turn supports the lower catalyst basket. Long life and remarkable freedom from repairs is assured and even if repairs become necessary to any of the tubes after long use it is a simple matter to replace a tube since they are not of special design. In fact in commercial units it is customary to use ordinary 4 inch boiler tubes which can be bought at a low price on the market and make any replacements which may become necessary, simple and cheap. It is an advantage of the preferred modifications of the converter of the present invention that it required a minimum of specially designed equipment and can therefore be built at a remarkably low first cost.

In contact sulfuric acid converters difficulty is sometimes encountered when the gases are not completely dried and traces of $SO_3$ removed, because when a converter is starting up the cold metal surfaces tend to condense any sulfuric acid which may be present in the incoming gases. This results in the formation of a ferrous or ferric sulfate scale and in the converters with embedded heat exchange tubes this has been a serious matter because of the tendency of such scale to break off and to plug up the catalyst. In the preferred modification of the converter of the present invention, however, any iron sulfate scale which might form on the tubes would fall down on top of the kieselguhr insulation at the bottom of the tubes where it does no harm but merely constitutes a small amount of additional insulation. This is an added feature of advantage in the preferred embodiment of the present invention and permits operation with a minimum of careful supervision of the $SO_2$ gases employed. (The only control required is the maintenance of the inlet gas temperature which is determined by the $SO_2$ concentration, lower temperatures being used with higher concentrations.) In fact the whole invention is peculiarly suited to plants in which skilled supervision is to be eliminated to the greatest possible degree. The upward coflow principle, resulting in an extraordinarily uniform and automatic control of temperature permits operation with relatively unskilled supervision. This is an important feature, particularly in connection with contact plants to be used by fertilizer manufacturers in place of chamber plants as the personnel of such companies rarely includes skilled sulfuric acid chemists for daily supervision of the plant.

In the claims the expression "direct heat exchange relation" is used to cover heat exchange through any stationary heat conducting wall in contradistinction to indirect heat exchange relation through a moving gas. This is true even in the case of an uninsulated central well 8. Gases in the central well could only exchange heat with gases in the catalyst tube indirectly through a moving gas stream, whereas heat exchange between the gases flowing upwardly around the tubes 3 is directly to the catalyst through the stationary tube wall.

What I claim is:

1. A method of carrying out exothermic catalytic vapor phase oxidations which comprises passing reaction gases upwardly in direct heat exchange relation but out of direct contact with the catalyst, reversing the flow of the reaction gases and bringing them to the bottom of the catalyst without substantial heat exchange with the catalyst on the downward flow and causing the gases, thus preheated, to pass upwardly through the catalyst in concurrent flow with the incoming reaction gases.

2. A method of carrying out catalytic vapor phase oxidations which comprises causing reaction gases to pass upwardly along rod-like catalyst masses in direct heat exchange relation but out of contact therewith, reversing the flow of the gases and causing them to pass downwardly, again reversing the flow of the gases and causing them to flow upwardly through the catalyst rods.

3. A method according to claim 2 in which the gases after passing over the catalyst rods are insulated from heat exchange with the catalyst on the downward flow.

4. A method of carrying out catalytic vapor phase oxidations which comprises introducing reaction gases into direct heat exchange relation but out of direct contact with the catalyst above the lowest point of the catalyst, causing the gases so introduced to pass upwardly out of contact but with heat exchanging relation with the catalyst, reversing the flow and causing them to flow to a point below the point of introduction, again reversing their flow and passing them upwardly through the catalyst, the initial portion of which is uncooled by heat exchange relation with the incoming fresh reaction gases.

5. A method of carrying out catalytic vapor phase oxidations which comprises causing reaction gases to pass upwardly in direct heat exchanging relation but out of direct contact with the main portion of the catalyst, reversing the flow, bringing the gases on the reverse flow to a point below the bottom of the catalyst, passing them through a separate preheating catalyst layer, and causing the partly reacted gases to flow upwardly through the main portion of the catalyst.

6. A method of carrying out catalytic vapor phase oxidations which comprises causing reaction gases to pass upwardly over rod-like catalyst masses in direct heat exchanging relation but out of direct contact therewith, reversing the flow of the gases and causing them to flow downwardly to a point below the bottom of the catalyst rods, passing them through a preheating catalyst layer and then passing the partly reacted gases upwardly through the catalyst rods.

7. A method according to claim 6 in which the reaction gas is introduced into direct heat exchanging relation with the catalyst rods at a point substantially above the bottom of said rods, the bottom portion of said rods being insulated from heat exchange with the reaction gases introduced.

8. A method according to claim 6 in which the gases after passing upwardly through the catalyst rods are then passed through a catalyst layer which is not in heat exchanging relation with the incoming reaction gases.

9. A method according to claim 6 in which the gases after leaving the catalyst rods are reduced in temperature and then passed through a catalyst layer which is out of heat exchange relation with the reaction gases introduced.

10. A catalytic apparatus comprising a vertical multitubular converter with upper and lower tube sheets, catalyst in the tubes, means for introducing reaction gas around the tube near the bottom of the tube sheet, a duct extending from below the bottom tube sheet to near the top tube sheet, whereby the reaction gases after flowing upwardly over the tubes are caused to reverse their flow and flow downwardly through the duct, a catalyst layer enclosed in a catalyst basket over the upper tube sheet, means for causing the gases after leaving the duct to pass upwardly through the catalyst tubes and around the basket in an annulus between the basket and converter shell, and means for cooling the gas stream in its passage between the tops of the catalyst tubes and the catalyst layer in the basket.

ALLING P. BEARDSLEY.